United States Patent
Ikeda et al.

(10) Patent No.: US 6,975,351 B2
(45) Date of Patent: Dec. 13, 2005

(54) APPARATUS AND SYSTEM FOR CAMERA HEAD DETERMINATION IN AN IMAGE SENSING SYSTEM

(75) Inventors: Keiichi Ikeda, Yokohama (JP); Yosito Haba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 923 days.

(21) Appl. No.: 09/887,659

(22) Filed: Apr. 24, 2001

(65) Prior Publication Data
US 2002/0018126 A1 Feb. 14, 2002

Related U.S. Application Data

(63) Continuation of application No. 08/842,394, filed on Apr. 23, 1997, now abandoned.

(30) Foreign Application Priority Data

Apr. 26, 1996 (JP) .................................. 8-107646
May 31, 1996 (JP) .................................. 8-138672

(51) Int. Cl.[7] .......................................... H04N 5/232
(52) U.S. Cl. ............................................. 348/211.14
(58) Field of Search ................................ 348/211.14

(56) References Cited

U.S. PATENT DOCUMENTS

| | | | |
|---|---|---|---|
| 4,450,480 A | | 5/1984 | De La Cierva |
| 4,539,595 A | * | 9/1985 | Warner .................... 348/211.5 |
| 4,926,258 A | * | 5/1990 | Sasaki et al. ................. 348/72 |
| 5,389,968 A | * | 2/1995 | Koyanagi et al. ........ 348/222.1 |
| 5,455,634 A | | 10/1995 | Tamura et al. |
| 5,479,206 A | * | 12/1995 | Ueno et al. .............. 348/211.5 |
| 5,486,853 A | * | 1/1996 | Baxter et al. ............ 348/222.1 |
| 5,585,840 A | * | 12/1996 | Watanabe et al. ............. 348/65 |
| 5,627,583 A | | 5/1997 | Nakamura et al. |
| 5,696,553 A | * | 12/1997 | D'Alfonso et al. ..... 348/211.14 |
| 5,729,282 A | * | 3/1998 | Okawa ..................... 348/14.12 |
| 5,821,995 A | * | 10/1998 | Nisikawa ................. 348/211.5 |
| 5,870,139 A | | 2/1999 | Cooper et al. |

(Continued)

FOREIGN PATENT DOCUMENTS

JP 61-177871 8/1986

(Continued)

OTHER PUBLICATIONS

Japanese Office Action dated Jan. 6, 2004.

(Continued)

*Primary Examiner*—Thai Tran
*Assistant Examiner*—James M. Hannett
(74) *Attorney, Agent, or Firm*—Morgan & Finnegan, LLP

(57) ABSTRACT

In a head detachable camera comprising a camera head and an image processing unit which does not have an exclusive line for notifying the type of image sensing device used in the camera head, when the power switch is turned on, vertical interval data signal processing units of the camera head and the image processing unit are set to a predetermined communication mode, such as one conforming to the NTSC video mode. Under this situation, identification information showing the number of pixels and the video rate used in the image sensing device is transmitted from the camera head by multiplexing the identification information in a blanking period of an image signal, and the communication mode of the camera head is changed in accordance with the number of pixels and the video rate of the image sensing device, if necessary. In the image processing unit, the communication mode is set to one corresponding to the received identification information, and the image processing unit transmits a clock and synchronizing signals corresponding to the communication mode to the camera head.

15 Claims, 18 Drawing Sheets

U.S. PATENT DOCUMENTS 5,920,342 A * 7/1999 Umeda et al. ......... 348/211.14
5,978,651 A * 11/1999 Eto et al. ................. 348/14.13
6,295,082 B1 * 9/2001 Dowdy et al. ................ 348/72

FOREIGN PATENT DOCUMENTS

| JP | 62-224169 | 10/1987 |
| JP | 3-105331 | 5/1991 |
| JP | 3-114371 | 5/1991 |
| JP | 4-348674 | 12/1992 |
| JP | 5-284399 | 10/1993 |
| JP | 6-339065 | 12/1994 |
| JP | 7-7648 | 1/1995 |
| JP | 7-95458 | 4/1995 |
| JP | 7-203274 | 8/1995 |
| JP | 7-298184 | 11/1995 |
| JP | 8-18839 | 1/1996 |
| JP | 8-298607 | 11/1996 |

OTHER PUBLICATIONS

Japanese Office Action dated Apr. 19, 2005.

* cited by examiner

FIG. 10A   COMMAND FRAME FORMAT

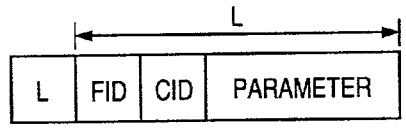

FIG. 10B   ACK FRAME FORMAT

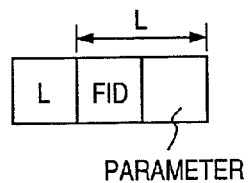

PARAMETER
00h : NO ERROR
OTHER : ERROR

FIG. 10C

FID ( FRAME IDENTIFIER )

- ORIGINATOR DESIGNATION BITS
  - 00 : HOST TERMINAL
  - 01 : IMAGE PROCESSING UNIT
  - 10 : CAMERA HEAD
- DESTINATION DEVICE DESIGNATION BITS
  - 00 : HOST TERMINAL
  - 01 : IMAGE PROCESSING UNIT
  - 10 : CAMERA HEAD
- RESERVED ( FIXED TO 0 )
- FRAME IDENTIFICATION BIT
  - 0 : COMMAND FRAME
  - 1 : ACK FRAME

FIG. 10D

CID ( COMMAND IDENTIFIER )

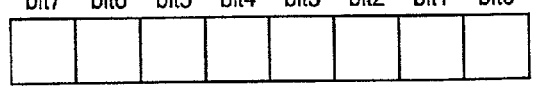

- COMMAND TYPE BITS
- RESPONSE IDENTIFICATION BIT
  - 1 : UNSUCCESSFUL
  - 0 : OTHER

FIG. 11A

INITIALIZATION REQUEST COMMAND

| | | | | | | | | | |
|---|---|---|---|---|---|---|---|---|---|
| LENGTH | 0 | 0 | 0 | 0 | 0 | 0 | 1 | 0 | OCTET 1 |
| FID | 0 | 0 | 0 | 0 | 1 | 0 | 0 | 0 | OCTET 2 |
| CID | 0 | 0 | 0 | 0 | 0 | 0 | 0 | 0 | OCTET 3 |
| | REQUEST INITIALIZATION | | | | | | | | |

FIG. 11B

INITIALIZATION RESPONSE

| | | | | | | | | | |
|---|---|---|---|---|---|---|---|---|---|
| LENGTH | 0 | 0 | 0 | 0 | 0 | 0 | 1 | 0 | OCTET 1 |
| FID | 1 | 0 | 0 | 0 | 0 | 0 | 0 | 1 | OCTET 2 |
| CID | 0 | 0 | 0 | 0 | 0 | 0 | 0 | 0 | OCTET 3 |
| | RESPONSE INITIALIZATION DATA | | | | | | | | |
| PARAMETER 1 | CAMERA ATTRIBUTE OF PORT 1 | | | | | | | | OCTET 4 |
| PARAMETER 2 | CAMERA ATTRIBUTE OF PORT 2 | | | | | | | | OCTET 5 |

FIG. 11C

CAMERA ATTRIBUTE ( PARAMETER 1 , PARAMETER 2 )

| VALUE ( Hex ) | CAMERA ATTRIBUTE |
|---|---|
| 0 0 | NOT CONNECTED |
| 0 1 | PANFOCUS 200,000-PIXEL CCD |
| 0 2 | PANFOCUS 400,000-PIXEL CCD |
| 0 3 | ZOOM 200,000-PIXEL CCD |
| 0 4 | ZOOM 400,000-PIXEL CCD |

FIG. 12A

CAMERA ATTRIBUTE REQUEST COMMAND

| | | |
|---|---|---|
| LENGTH | 0 0 0 0 0 0 1 0 | OCTET 1 |
| FID | 0 0 0 0 1 0 0 1 | OCTET 2 |
| CID | 0 0 0 0 0 0 0 1 <br> REQUEST CAMERA ATTRIBUTE | OCTET 3 |

FIG. 12B

CAMERA ATTRIBUTE RESPONSE

| | | |
|---|---|---|
| LENGTH | 0 0 0 0 0 0 1 1 | OCTET 1 |
| FID | 0 0 0 0 0 1 1 0 | OCTET 2 |
| CID | 0 0 0 0 0 0 0 1 <br> RESPONSE CAMERA ATTRIBUTE | OCTET 3 |
| PARAMETER 1 | CAMERA ATTRIBUTE | OCTET 4 |

FIG. 13A

PORT CHANGEOVER REQUEST COMMAND

| | | |
|---|---|---|
| LENGTH | 0 0 0 0 0 0 1 1 | OCTET 1 |
| FID | 0 0 0 0 1 0 0 0 | OCTET 2 |
| CID | 0 0 0 0 0 0 1 0 REQUEST PORT CHANGEOVER | OCTET 3 |
| PARAMETER 1 | PORT NUMBER | OCTET 4 |

FIG. 13B

PORT CHANGEOVER RESPONSE ( SUCCESSFUL )

| | | |
|---|---|---|
| LENGTH | 0 0 0 0 0 0 1 1 | OCTET 1 |
| FID | 0 0 0 0 0 0 0 1 | OCTET 2 |
| CID | 0 0 0 0 0 0 1 0 RESPONSE TO PORT CHANGEOVER | OCTET 3 |
| PARAMETER 1 | PORT NUMBER | OCTET 4 |

FIG. 13C

PORT CHANGEOVER RESPONSE ( UNSUCCESSFUL )

| | | |
|---|---|---|
| LENGTH | 0 0 0 0 0 0 1 1 | OCTET 1 |
| FID | 0 0 0 0 0 0 0 1 | OCTET 2 |
| CID | 1 0 0 0 0 0 1 0 RESPONSE TO PORT CHANGEOVER | OCTET 3 |
| PARAMETER 1 | PORT NUMBER | OCTET 4 |

APPARATUS AND SYSTEM FOR CAMERA HEAD DETERMINATION IN AN IMAGE SENSING SYSTEM

This application is a continuation of U.S. Ser. No. 08/842,394, filed Apr. 23, 1997, now abandoned.

BACKGROUND OF THE INVENTION

The present invention relates to an image sensing apparatus, an image processing apparatus, and an image sensing system and, more particularly, to an image sensing apparatus suitable as a camera head of a head-detachable camera which comprises a charge-coupled device and its controller, an image processing apparatus suitable as a signal processing apparatus of the head-detachable camera for performing various signal processes on signals obtained by the camera head and generating image signals, and an image sensing system, as the head-detachable camera, comprising the above image sensing apparatus and image processing apparatus which can be separated.

Conventionally, there is a head-detachable camera comprising a camera head having a charge-coupled device (CCD) and a controller for the CCD and a signal processing unit, which can be separated from the camera head, for performing various signal processes on signals obtained by the CCD of the camera head and generating image signals, where the camera head and the signal processing unit are connected by a cable to configure the head-detachable camera. In such the head-detachable camera, there is a merit that the camera head, which is a substantial image sensing unit, can be down-sized and lightened by separately configuring the signal processing unit. Further, there is a head-detachable camera to which a plurality of interchangeable camera heads, such as a panfocus camera and a zoom camera can be connected. In such the head-detachable camera, the signal processing unit is configured as a board with an image memory, to be installed on a computer, thereby an image sensed by the camera head can be instantaneously inputted to the computer.

An example of a head-detachable camera is described below.

FIG. 17 is a block diagram illustrating a configuration of a conventional image sensing system.

In FIG. 17, reference numerals 1140 and 1150 denote camera heads (will be described later in detail); 1200, an image processing unit; 1400, a host terminal. The camera head 1140 or 1150 is connected to the image processing unit 1200 via a cable 1109. The image processing unit 1200 is connected to the host terminal 1400 via a bus interface (I/F) 1208. The image processing unit 1200 and the camera head 1140 or 1150 are controlled from the host terminal 1400 via the bus I/F 1208.

The camera head 1140 is a monofocal CCD camera having 200,000 pixels, and the camera 1150 is a zoom CCD camera having 400,000 pixels.

First, a configuration of the monofocal CCD camera 1140 will be explained.

Reference numeral 1106 denotes a system controller which comprises a one-chip microcomputer having CPU, ROM, RAM, a control port, a communication port, and so on. The system controller 1106 controls each unit of the camera head 1140, and performs bidirectional communication with the image processing unit 1200.

Reference numeral 1101 denotes a lens unit having an object lens, a focus lens, and a focus ring for moving the focus lens manually; 1102, an iris unit for adjusting the quantity of incoming light through the lens system 1101, and the iris unit 1102 has an iris diaphragm and an iris ring for moving the iris diaphragm manually; 1103, an image sensing device, such as a CCD, for photo-electric conversing the image passed through the lens unit 1101 and the iris unit 1102 into electric signals, and the image sensing device 1103 has 200,000 image sensing elements; and 1105, an image sensing device driver, such as a timing signal generator (TG), which controls charging operation, reading operation, and resetting operation of the image sensing device 1103 in accordance with the number of pixels. Shutter speed can be changed by controlling the TG 105 from the system controller 1106 via a control line 1110.

Reference numeral 1108 denotes a synchronizing signal generator (SSG) which generates image synchronizing signals 1112, such as a horizontal synchronizing signal (HD), a vertical synchronizing signal (VD), and an image clock signal, on the basis of a clock signal from the TG 1105; and 1104, a sample-and-hold and automatic gain control circuit (S/H·AGC) which performs sample-and-hold operation for reducing noises of stored charges as well as adjusts gain for an image signal, and outputs an image signal 1114. The gain for an image signal can be adjusted by controlling the S/H·AGC 1104 from the system controller 1106 via a control line 1111. Reference numeral 1113 denotes a data and data control line for performing bidirectional communication between the camera head 1140 and the image processing unit 1200, and the line 1113 is connected to a serial communication port of the system controller 1106. Reference numeral 1107 denotes a connector which can be connected and disconnected to/from the cable 1109.

Next, a configuration of the camera head 1150 will be explained. The differences between the camera heads 1140 and 1150 are a zoom lens unit 1121, an iris unit 1122, and an image sensing device 1123. Other units and elements of the camera head 1150 are the same as those of the camera head 1140, thus the explanation of those are omitted.

The zoom lens unit 1121 comprises an object lens, a focus lens, a focus motor for moving a focus ring, a zoom lens, a zoom motor for moving a zoom ring. Power zooming and auto-focusing can be realized by controlling the zoom lens unit 1121 from the system controller 1106 via a control line 1124.

The iris unit 1122 adjusts the quantity of incoming light through the lens unit 1101, and has an iris diaphragm and an iris motor for moving an iris ring. By controlling the iris unit 1122 from the system controller 1106 via a control line 1125, open/close operation of the iris diaphragm is controlled. The system controller 1106 controls the aperture, shutter speed, and gain for the S/H· AGC 1104 so as to keep data values indicating brightness of an object image sent from the image processing unit 1200 substantially constant, thereby an automatic exposure control can be realized. Further the image sensing device 1123, such as a CCD, performs photoelectric conversion on the image passed through the lens unit 1121 and the iris unit 1122 and converts into electric signals. The image sensing device 1123 has 400,000 image sensing elements.

Next, the image processing unit 1200 will be explained.

Reference numeral 1250 denotes a system controller which comprises a one-chip microcomputer having CPU, ROM, RAM, a control port, a communication port, and so on. The system controller 1250 controls each unit of the image processing unit 1200, performs automatic white balance control, and communicates with the camera head 1140 or 1150 and with the host terminal 1400 via the bus I/F 1208.

Further, it interprets a command from the host terminal 1400, and performs an operation requested by the host terminal 1400.

Reference numeral 1201 denotes an A/D converter for converting the image signal 1217 transmitted via the cable 1109 from the camera head 1140 or 1150 into a digital image signal 1218; and 1202, a signal processing circuit for converting the digital image signal 1218 into a standardized digital image signal 1219. The signal processing circuit 1202 generates and transmits an interruption signal for informing of data indicating brightness of an object to be used for exposure control, white balance data for white balance control, and focus data for focus control to the system controller 1250 at the period of a vertical synchronization signal. When the system controller 1250 acknowledges the interruption, it reads the brightness data, the white balance data, and the focus data via a switch 1203 and a serial data line 1223 and writes these data in the RAM of the system controller 1250.

Further, reference numeral 1204 denotes an encoder for converting the standardized digital image signal 1219 to a multiplexed composite signal 1221 and it outputs the composite signal 1221 to an image output connector 1210; 1206, an image memory for storing digital image signals from the signal processing circuit 1202 and a scan rate converter (SRC) 1207; 1205, a memory controller for performing read/write control from/to the image memory 1206; and 1207, the scan rate converter (SRC) for converting a digital image signal 1213 in the image processor 1200 into a digital image signal 1214 to be outputted to the host terminal 1400 so as to absorb the difference in length-to-breadth ratio between a frame image represented by the digital image signal 1213 and a frame image suitable for the host terminal 1400.

The switch 1203 selects either the standardized digital image signal 1219 from the signal processing circuit 1202 or a digital image signal 1216 stored in the image memory 1206 to be outputted as an output 1225 to the encoder 1204, and it is controlled by the system controller 1250 via a control line 1224.

Further, the bus interface (I/F) 1208 is connected to a bus of a computer as the host terminal 1400, and it interfaces between the host terminal 1400 and the image processing unit 1200 to communicate the digital image signal 1214 and a control data 1226 as well as to control the memory controller 1205 and the SRC 1207 by the host terminal 1400.

Reference numeral 1215 denotes image synchronizing signals of the image processing unit 1200 which correspond to the image synchronizing signals from the camera head 1140 or 1150, and the signals enter the signal processing circuit 1202, the memory controller 1205, and the encoder 1204.

Reference numeral 1222 denotes serial data and data control line for performing bidirectional data communication between the camera head 1140 or 1150 and the image processing unit 1200, and it is connected to a serial data port of the system controller 1250.

Reference numeral 1226 denotes parallel data and data control line for performing bidirectional data communication between the host terminal 1400 and the image processing unit 1200, and it is connected to a control port of the system controller 1250.

A user can select a camera head in accordance with his/her utilization purpose by interchanging camera heads. When interchanging camera heads, parameters have to be set in the signal processing circuit 1202 in accordance with the type of the connected camera head. For example, the number of pixels used in the image sensing device 1103 of the panfocus camera 1140 is 200,000, and that of the image sensing device 1123 of the zoom camera 1150 is 400,000. In this case, the signal processing circuit 1202 is initialized in 200,000-pixel mode when the camera head 1140 is connected, and in 400,000 pixel mode when the camera head 1150 is connected.

In the configuration of the above image sensing system, an exclusive data line for informing the image processing unit 1200 of information, such as the number of pixels, of the image sensing device 1103 or 1123 of the connected camera head 1140 or 1150 from the camera head 1140 or 1150 is provided in the cable 1109. The signal processing circuit 1202 is initialized based on the information of the image sensing device 1103 or 1123 which is obtained via the exclusive data line.

However, there is an image sensing system which does not have an exclusive data line for notifying information on an image sensing device. An example of such the image sensing system is described below.

A configuration and operation of a head-detachable camera which does not have an exclusive data line for notifying information on the image sensing device will be explained with reference to FIG. 18. In FIG. 18, reference numeral 201 denotes a camera head; and 202, an image processing unit. In the camera head 201, reference numeral 203 denotes a CCD for converting an optical signal which is inputted through a lens (not shown) into an electric signal. A color image signal can be obtained by using a color filter attached on the surface of the CCD 203. Reference numeral 204 denotes a timing signal generator (TG) for generating various timing signals for reading an image signal from the CCD 203; and 205, an automatic gain controller (AGC) for adjusting gain for the image signal read from the CCD 203. The AGC 205 and the TG 204 are controlled by a camera control CPU 206, so that shutter speed and automatic exposure can be controlled.

Further, the CPU 206 exchanges commands and data with a signal processing control CPU 213 of the image processing unit 202. The commands and data are inputted to a vertical interval data signal (VIDS) processing unit 207 as serial data. The VIDS processing unit 207 has a function of multiplexing the input serial data in a vertical blanking period of the image signal obtained form the AGC 205 and outputting it, and a function of separating serial data from a horizontal synchronizing signal and a vertical synchronizing signal out of the composite synchronizing signal, sent from the image processing unit 202, to which serial data is multiplexed, then outputting the serial data to the camera control CPU 206 and the vertical and horizontal synchronizing signals to the TG 204. Note, the VIDS is a method for multiplexing digital data in a non-image portion of a vertical blanking period. The VIDS processing unit 207 of the camera head 201 multiplexes data in the vertical blanking period of an image signal, and, a VIDS processing unit 210 of the image processing unit 202 multiplexes data in all the areas of the synchronizing signals, and these VIDS processing units transfer the obtained composite signals to each other. The reason for employing the VIDS method for communication between the camera head 201 and the image processing unit 202 is to minimize the number of connection lines between them.

Each block of the camera head 201 operates in accordance with a reference clock signal provided from the image processing unit 202. For example, if the CCD 203 has 410,000 pixels and is driven in the NTSC video rate, the frequency of the reference clock signals has to be 14.31818

Mhz (4 frequency subcarrier (fsc)), and the clock signal of this fixed frequency is always provided from the image processing unit 202.

In the image processing unit 202, reference numeral 210 denotes the VIDS processing unit. The VIDS processing unit 210 has functions which are opposite to the VIDS processing unit 207 of the camera head 201, i.e., a function of multiplexing serial data inputted from the signal processing control CPU 213 in a composite synchronizing signal generated by a synchronizing signal generator 218, and a function of separating serial data from an image signal out of a multiplexed image signal transmitted from the camera head 201, then outputting the serial data to the signal processing control CPU 213 and the image signal to a signal processing circuit 211.

The synchronizing signal generator 218 is configured in correspondence with the camera head 201, and it generates horizontal and vertical synchronizing signals corresponding to the video method employed by the camera head 201 (e.g., NTSC, PAL) on the basis of a reference clock signal provided from a clock generator 217. If the camera head 201 is driven by the NTSC video rate, for example, horizontal and vertical synchronizing signals corresponding to the NTSC video rate are generated. In this case, a clock signal of 14.31818 Mhz is provided from the clock generator 217.

The signal processing circuit 211 performs analog-digital conversion on the input image signal into a digital signal, generates three lines of signals by using one-horizontal-line delay circuits. Further, it performs matrix operation on the signals of three lines, generates R, G and B color signals and multiplexes the R, G and B color signals in time division. Furthermore, it also performs white balance processing and γ correction, then generates color difference signals R-Y and B-Y and a luminance signal Y by performing color difference matrix operation. On the luminance signal Y, aperture correction in the horizontal and vertical directions is performed. The color difference signals and the luminance signal are outputted to a memory 212 as digital signals and to an encoder 214 where the signals are digital-analog converted into analog signals. Then, a synchronizing signal is added to the luminance signal Y, further color difference signals are added to it to generate a composite video signal. The generated composite video signal is outputted from an output terminal 220 to outside.

Reference numeral 215 denotes a bus controller for exchanging data with a computer bus 216, such as an industry standard architecture (ISA) bus and a peripheral component interconnect (PCI) bus, for example, which is a standard bus for computers, and it is connected to the computer bus 216 via address, data, input/output, write, read, interruption, clock, power, and ground signal lines, for example. A specific address is assigned to the bus controller 215, and the bus controller 215 decodes the address signal inputted from the computer bus 216 and controls transmission and reception of data to/from the signal processing control CPU and data-read operation from the memory 212 in accordance with the value of the data signal inputted when the address of the address signal matches the address of the bus controller 215. Accordingly, it is possible to control the image sensing system from a main CPU of a computer (not shown) via the computer bus 216.

In the image sensing system which does not have an exclusive data line for informing of information on an image sensing device as described above, the camera head and the signal processing unit are configured separately, thereby the camera head is down-sized, as well as interchange of plural kinds of camera heads having different functions, such a zoom function, becomes possible. However, there is a limitation that the CCD used in each interchangeable camera head must have the same number of pixels and must be operated at the same video rate. This is because if the number of pixels and the video rate used in the CCD are changed, speed of reading signals from the CCD has to be changed, and a processing clock rate in the signal processing unit also has to be changed accordingly.

Further, if the video rate changes, so does the resolution, thus frequencies of the synchronizing signals used in the camera head and the signal processing unit have to be changed. In order to do so, the signal processing unit has to recognize the number of pixels and the video rate of the camera head currently connected to the signal processing unit, and conform to them while operating the camera head. In the conventional image sensing system as shown in FIG. 18, however, since communication between the camera head 201 and the image processing unit 202 is performed with VIDS signals, there is a problem in which the communication can not be performed properly until the number of the pixels and the video rate of the CCD 203 in the camera head 201 is clearly identified and the image processing unit 202 conforms to them.

Further, in the image sensing system using an exclusive data line, when a user want to performs image sensing operation by using different camera heads, the use has to detach a currently connected camera head from the image processing unit then attach another camera, which is troublesome.

THE SUMMARY OF THE INVENTION

The present invention has been made in consideration of the above situation, and has as its object to provide an image sensing apparatus, an image processing apparatus, and an image sensing system comprising the above apparatuses, in which the image processing apparatus can appropriately correspond to different kinds of camera heads including CCD having different numbers of pixels and operated in different video rates.

According to the present invention, the foregoing object is attained by providing an image sensing apparatus connected to an external image processing apparatus comprising: image sensing means for sensing an object and outputting an image signal; communication means for transmitting the image signal and identification information on the image sensing means multiplexed in a blanking period of the image signal to the image processing apparatus as well as communicating with the image processing apparatus; and control means for controlling the image sensing means and a communication mode of the communication means in accordance with driving signals, transmitted from the image processing apparatus, which corresponds to the communication mode, wherein the communication means multiplexes the image signal and the identification information in accordance with the communication mode controlled by the control means.

The foregoing object is also attained by providing an image processing apparatus which processes an image signal transmitted from an image sensing apparatus, comprising: communication means for receiving the image signal and identification information multiplexed in a blanking period of the image signal from the image sensing apparatus and communicating with the image sensing apparatus; driving signals generation means capable of generating plural kinds of driving signals for driving the image sensing apparatus; signal processing means for processing the image signal in a signal processing method corresponding to a communication mode; and control means for controlling the communication mode of the communication means and the driving signals generation means in accordance with the identification information.

Further, the foregoing object is also attained by providing an image sensing system having an image sensing apparatus and an image processing apparatus, and the image sensing apparatus comprising: image sensing means for sensing an object and outputting an image signal; first communication means for transmitting the image signal and identification information on the image sensing means multiplexed in a blanking period of the image signal to the image processing apparatus as well as communicating with the image processing apparatus; and first control means for controlling the image sensing means and a communication mode of the first communication means and controlling the image sensing means and the first communication means in accordance with a driving signals, transmitted from the image processing apparatus, which corresponds to the communication mode, and the image processing apparatus comprising: second communication means for receiving the image signal and the identification information multiplexed in the blanking period of the image signal from the image sensing apparatus and communicating with the image sensing apparatus; driving signals generation means capable of generating plural kinds of driving signals for driving the image sensing apparatus; signal processing means for processing the image signal in a signal processing method corresponding to the communication mode; and second control means for controlling the communication mode of the second communication means and the driving signals generation means in accordance with the identification information wherein the first communication means multiplexes the image signal and the identification information in accordance with the communication mode controlled by the first control means.

According to the above image sensing apparatus, image processing apparatus, and image sensing system, the image sensing apparatus transmits identification information which is multiplexed in an image signal to the image processing apparatus, and the image processing apparatus can send a driving signal corresponding to the received identification information. Therefore, without an exclusive data line for informing of the type of the image sensing apparatus, any of plural types of image sensing apparatuses can be selectively connected to the image processing apparatus and the image processing apparatus can process the obtained image signal.

It is another object of the present invention to provide an image sensing apparatus, an image processing apparatus, and an image sensing system capable of performing signal processes in accordance with the attributes of image sensing apparatuses in a case where a plurality of image sensing apparatuses are connected to the image processing apparatus.

According to the present invention, the foregoing object is attained by providing an image processing apparatus comprising: a plurality of connectors capable of connecting to a plurality of image sensing apparatuses; signal processing means capable of performing a plurality of different signal processings in correspondence with the plurality of image sensing apparatuses; switching means for switching the plurality of connectors to connect one of the plurality of connectors to the signal processing means; and control means for controlling the switching means, and the signal processing means to perform signal processing in a signal processing corresponding to an attribute of an image sensing apparatus connected to the connector to which the switching means is switched.

According to the above image processing apparatus, without interchanging camera heads, it is possible to switch to the desired camera head to be used as well as the image processing apparatus can process obtained signals from the camera head. Therefore, the operability of an image sensing system, when image sensing operation is performed by using a plurality of camera heads, improves.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 10A to 10D show configurations of command frames according to the third embodiment;

FIGS. 11A to 11C show configurations of commands for initialization according to the third embodiment;

FIGS. 12A and 12B are explanatory views showing configurations of camera attribute commands according to the third embodiment;

FIGS. 13A to 13C are explanatory views showing configurations of commands for switching ports according to the third embodiment;

DETAILED DESCRIPTION OF THE PREFERRED EMBODIMENTS

Preferred embodiments of the present invention will be described in detail in accordance with the accompanying drawings.

<First Embodiment>

Figure 1:
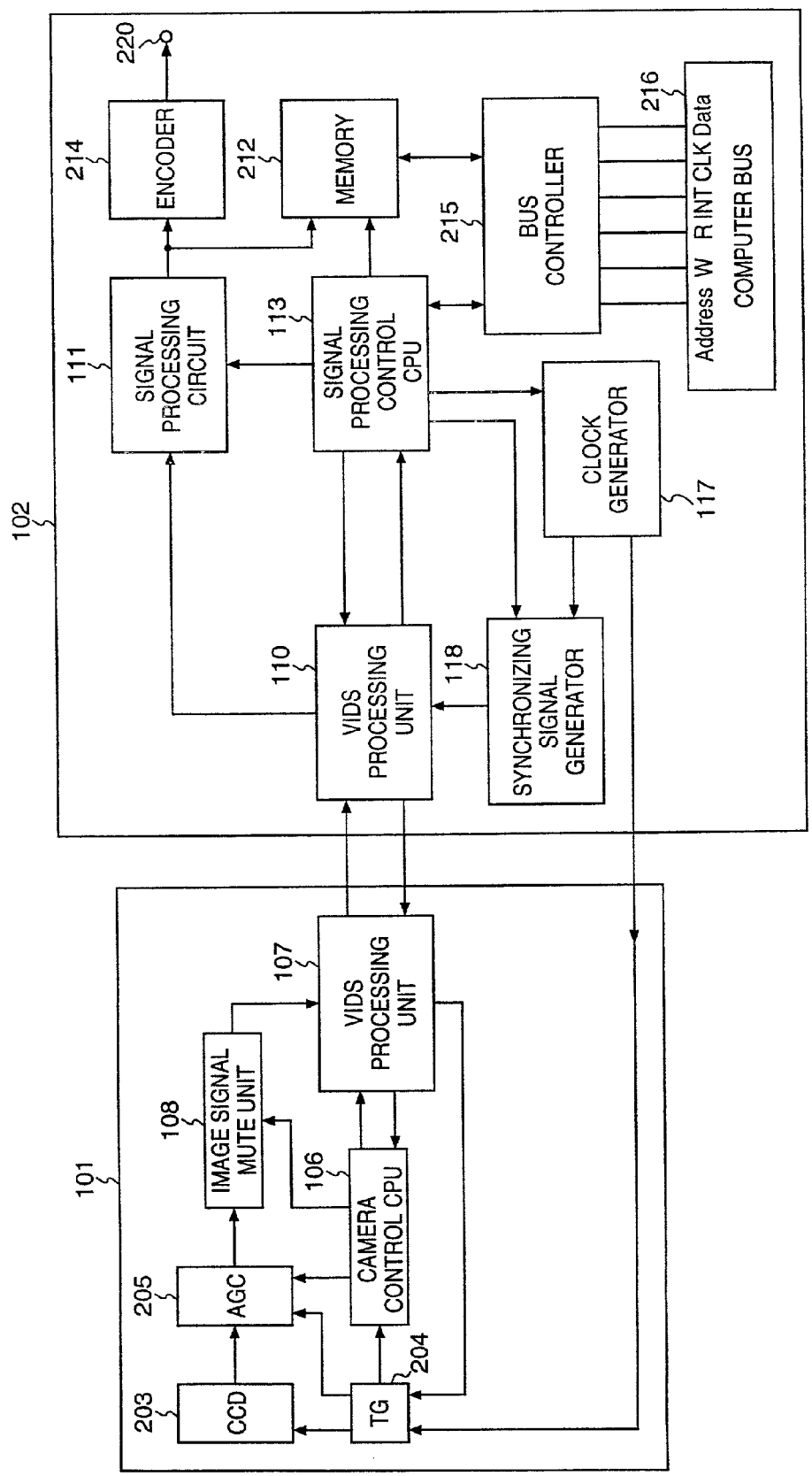
FIG. 1 is a block diagram illustrating a configuration of an image sensing system according to a first embodiment of the present invention.
Figure 2:
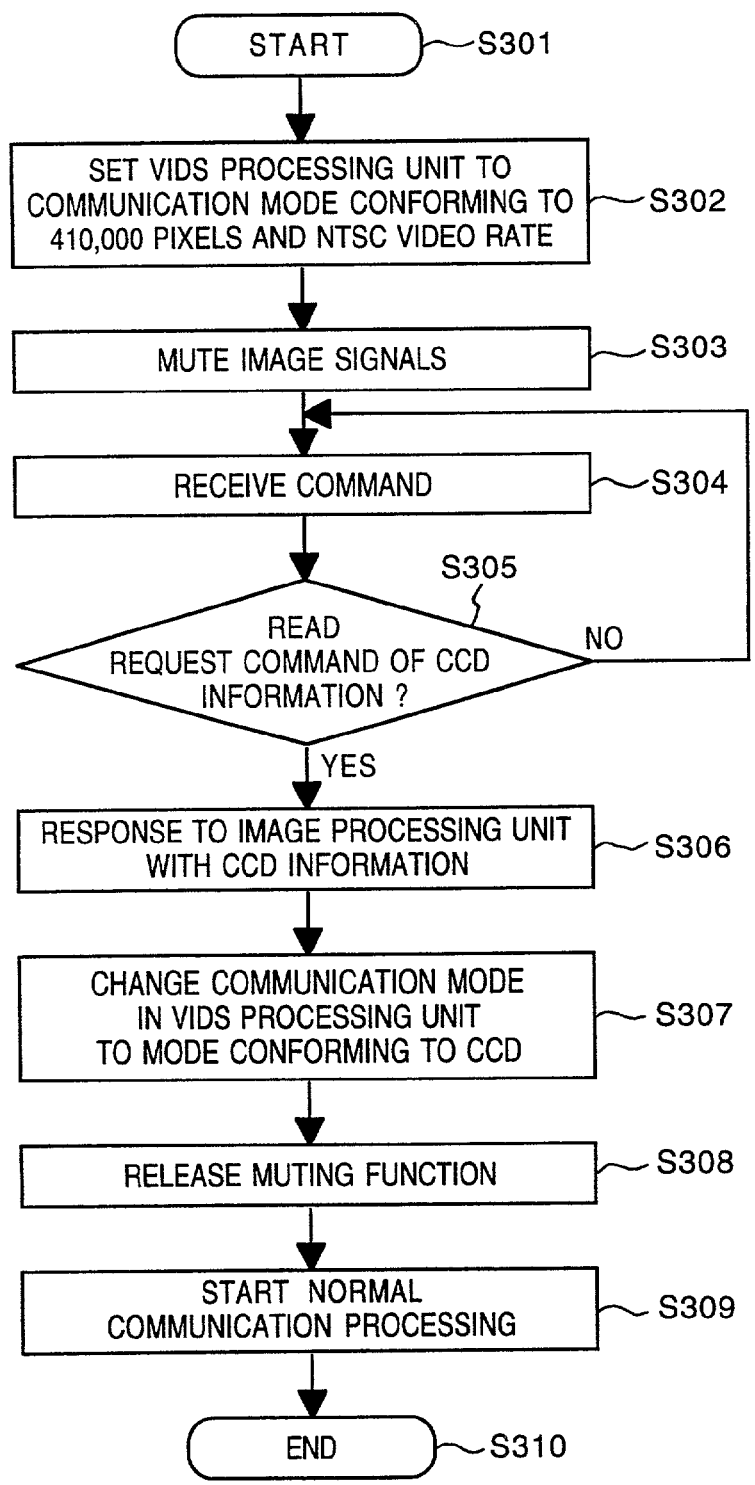
FIG. 2 is a flowchart showing an initial communication process in a camera head according to the first embodiment.
Figure 3:
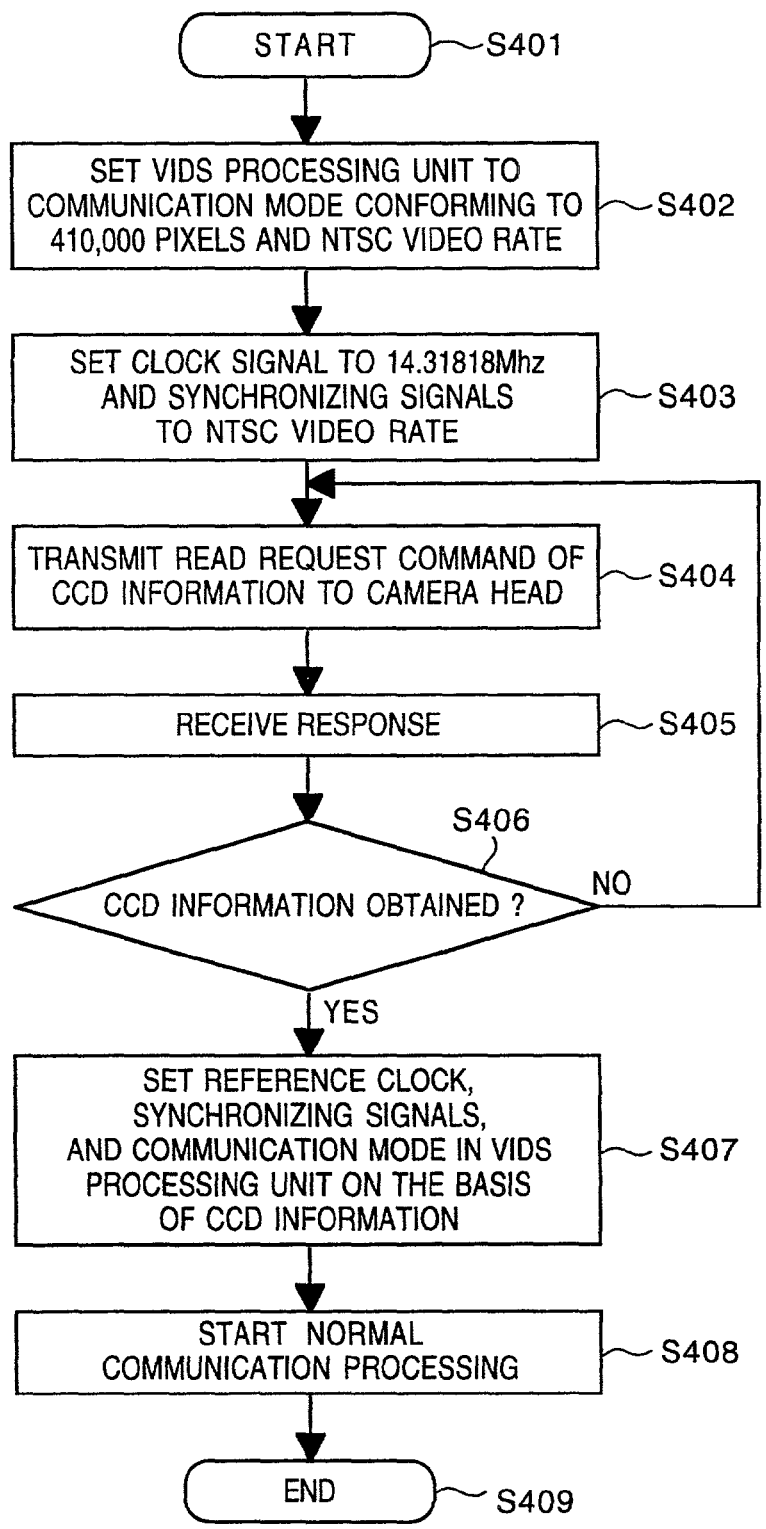
FIG. 3 is a flowchart showing an initial communication process in an image processing unit according to the first embodiment.
Figure 18:
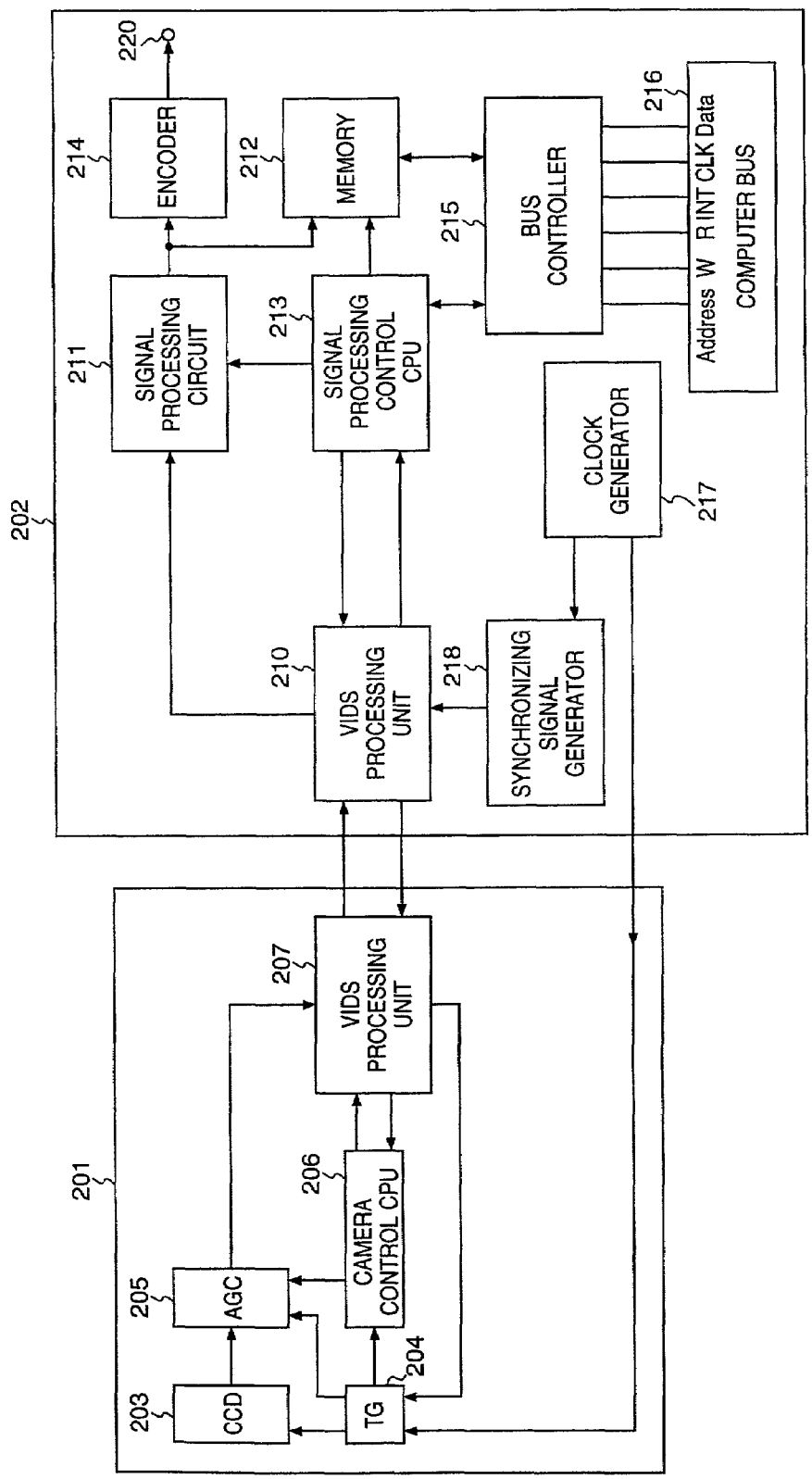
FIG. 18 is a block diagram illustrating another configuration of a conventional image sensing system.

FIG. 1 is a block diagram illustrating a configuration of an image sensing system according to a first embodiment of the present invention. Further, FIG. 2 is a flowchart showing an initial communication process in a camera head according to the first embodiment, and FIG. 3 is a flowchart showing an initial communication process in an image processing unit according to the first embodiment. The first embodiment is explained with reference to FIGS. 1 to 3 below. Note, in FIG. 1, the same units and elements as those in FIG. 18 are referred by the same reference numerals, and explanations of those are omitted.

Reference numeral 101 denotes a camera head; and 102, an image processing unit. As shown in FIG. 1, an image signal mute unit 108 is provided to the conventional camera head shown in FIG. 18. The image signal mute unit 108 can switch whether to output a signal from the AGC 205 directly to a VIDS processing unit 107 or to output the signal after muting its image signal portion to a pedestal level. The VIDS processing unit 107 is configured so as to be able to change the multiplexing position of serial data to be multiplexed and the number of multiplexed data per signal of one horizontal line in accordance with the number of pixels and the operating video rate of the CCD 203 under control of a camera control CPU 106.

Further, a VIDS processing unit 110 in the image processing unit 102 can also change the multiplexing position of serial data to be multiplexed with synchronizing signals and the number of multiplexed data per horizontal line under control of a signal processing control CPU 113. Reference numeral 117 is a clock generator having a plurality of quartz oscillators, and which clock signal generated by one of the plurality of quartz oscillators is to be outputted can be switched under control of the signal processing control CPU 113. A synchronizing signal generator 118 is configured so as to be able to generate and output synchronizing signals corresponding to the number of pixels and the video rate of the CCD under control of the signal processing control CPU 113.

A clock signal from the clock generator 117 and synchronizing signals generated by the synchronizing signal generator 118 are inputted to a signal processing circuit 111 via a route which is not shown. The mode (400,000 or 200,000 pixels) of the signal processing circuit 111 is set in accordance with a control signal from the signal processing control CPU 113 so that the signal processing circuit 111 can perform processes corresponding to the number of pixels and the video rate of the CCD 203.

Next, an operation of the aforesaid image sensing system will be described.

After the power switch is turned on (steps S301 and S401 in FIGS. 2 and 3, respectively), the camera control CPU 106 and a signal processing control CPU 113 respectively sets a mode corresponding to a 410,000 pixel CCD and NTSC video rate to the VIDS processing units 107 and 110 as a communication mode (step S302 and S402). More specifically, the mode setting is performed for controlling the number of data to be multiplexed in one horizontal period, the beginning position of multiplexing, and polarity of the synchronizing signal, and the mode has to be changed to a mode corresponding to the number of pixels and the video rate of the CCD 203.

Thereafter, the camera control CPU 106 mutes image signals by controlling the image signal mute unit 108 (step S303). The signal processing control CPU 113 controls the clock generator 117 and the synchronizing signal generator 118 to set the reference clock to 14.31818 Mhz and set the horizontal and vertical synchronizing signals to 63.5 us and 16.7 ms which are the NTSC video rate (step S403), respectively. These clock and synchronizing signals are provided to the camera head 101 as driving signals. At this stage, regardless of the number of pixels or the video rate of the CCD 203, image signals are read from the CCD 203 at the NTSC video rate in accordance with the input driving signal.

Then, the signal processing control CPU 113 transmits a request command (read request command) for reading CCD information which indicates the number of pixels, an arrangement of color filter, and the video rate, to the camera head 101 in a vertical blanking period (step S404). Then, in the next vertical blanking period, the signal processing control CPU 113 reads the response from the camera head 101 (step S405). If the response is not the CCD information which is the response to the read request command (step S406), the signal processing control CPU 113 again transmits a read request command of the CCD information (step S404). After that, until the CCD information, i.e., identification information as the response to the read request command, is received, steps S404 to S406 are repeated.

During the above period, the image signals are muted in the camera head 101. The reason for muting the image signals is that the image is disturbed during initial communication between the camera head 101 and the image processing unit 102. The VIDS processing units 107 and 110 are both set to the mode corresponding to 410,000 pixel and the NTSC video rate as a communication mode and operate in accordance with the same clock and synchronizing signals, communication between the VIDS processing units 107 and 110 is performed normally. Therefore, the read request command of the CCD information transmitted from the signal processing control CPU 113 is eventually received by the camera head 101 when synchronization is achieved between the camera head 101 and the image processing unit 102.

While muting the image signals, the camera head 101 observes input of a read request command of the CCD information from the image processing unit 102 (steps S304 and S305). When receiving the request command, the camera head 101 responds to the signal processing control CPU 113 with the CCD information (step S306). Then, the camera head 101 sets the communication mode in the VIDS processing unit 107 to a mode conforming to the number of the pixels and the video rate of the CCD 203 corresponding to the CCD information (step S307). Next, the muting function is released (step S308), and normal communication processing is performed thereafter (step S309).

Further, when the CCD information as a response to the read request command is transmitted from the camera head 101, the signal processing control CPU 113 controls the clock generator 117 and the synchronizing signal generator 118 to change a clock and a synchronizing signal, if necessary, in accordance with the responded CCD information. In addition, the signal processing control CPU 113 changes the communication mode in the VIDS processing unit 110, if necessary, and controls the signal processing circuit 111 (step S407), and performs normal communication processing thereafter (step S408). After the aforesaid initial communication process, communication between the camera head 101 and the image processing unit 102 as well as image signal processes are performed appropriately.

Note, in the first embodiment, both the camera head 101 and the image processing unit 102 are operated in a mode conforming to the NTSC video rate during the initial communication process, however, the present invention is not limited to this. For example, it is possible to operate the camera head 101 and the image processing unit 102 in a mode based on other video standard, such as PAL.

<Second Embodiment>

Figure 4:
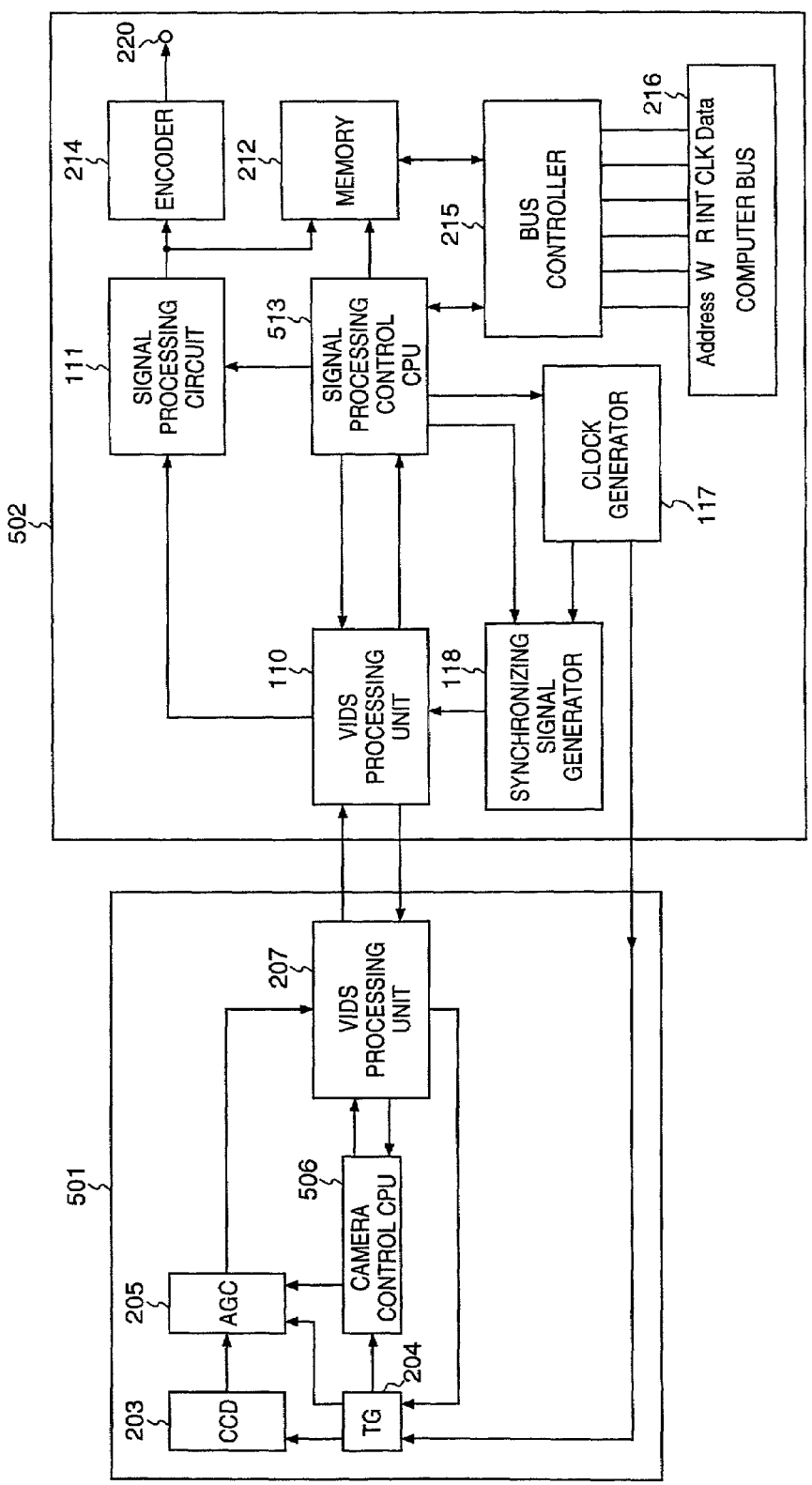
FIG. 4 is a block diagram illustrating a configuration of an image sensing system according to a second embodiment of the present invention.
Figure 5:
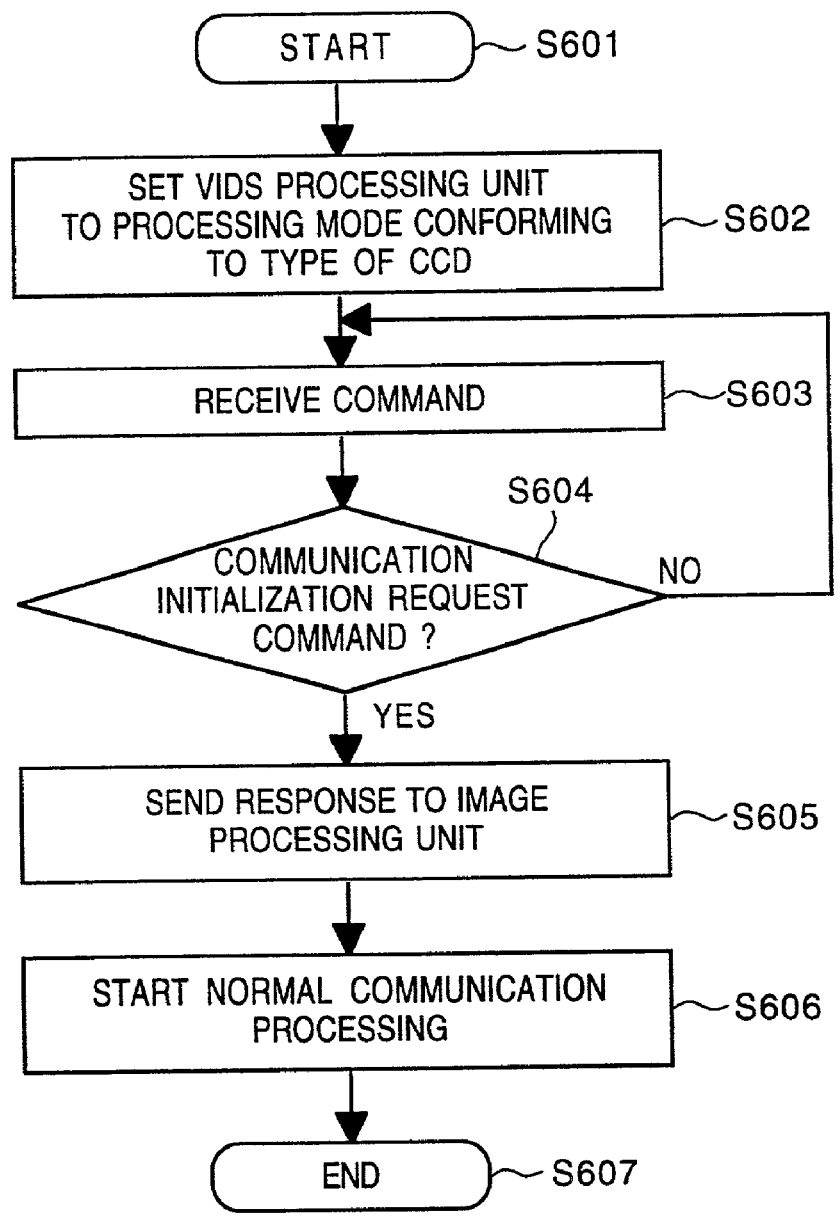
FIG. 5 is a flowchart showing an initial communication process in a camera head according to the second embodiment.
Figure 6:
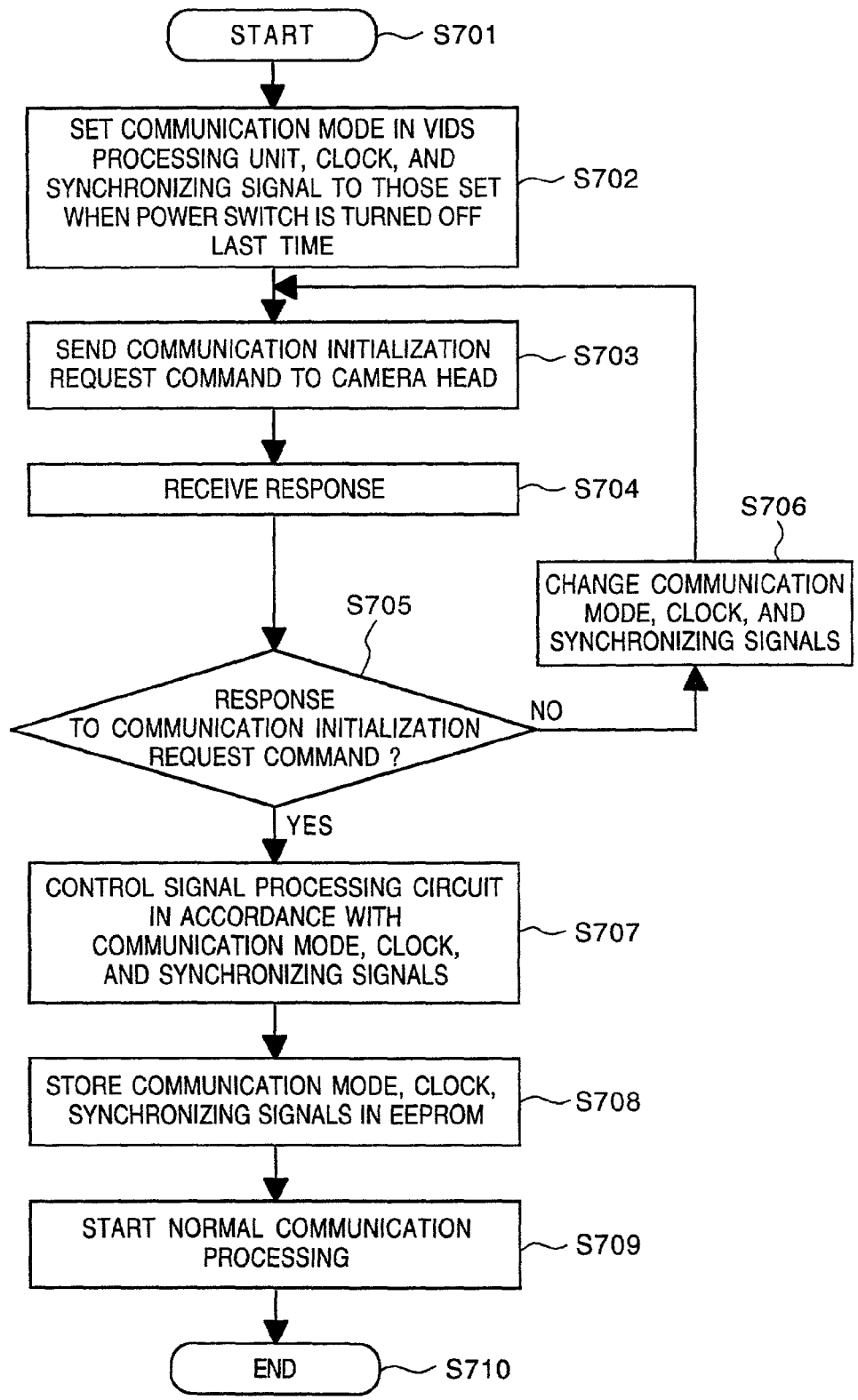
FIG. 6 is a flowchart showing an initial communication process in an image processing unit according to the second embodiment.

FIG. 4 is a block diagram illustrating a configuration of an image sensing system according to a second embodiment of the present invention, and FIG. 5 is a flowchart showing an initial communication process in a camera head according to the second embodiment. Further, FIG. 6 is a flowchart showing an initial communication process in an image processing unit according to the second embodiment. The second embodiment will be explained with reference to FIGS. 4 to 6 below. It should be noted that the same units and elements in FIG. 4 as those in FIG. 1 of the first embodiment and in FIG. 18 of the conventional example are referred by the same reference numerals, and explanations of those are omitted.

Reference numeral 501 denotes a camera head, and reference numeral 502 denotes an image processing unit. In the second embodiment, the camera head 501 has the same configuration as that of the conventional example shown in FIG. 18, however, processes performed by the camera control CPU 506 differ. Further, the configuration of the image processing control unit 502 is the same as that of the first embodiment shown in FIG. 1, however, processes performed by the signal processing CPU 513 differ.

With the aforesaid configuration, after the power switch is turned on (steps S601 and S701), the camera control CPU 506 sets a communication mode in the VIDS processing unit 207 in accordance with the number of the pixels and video rate of the CCD of itself (step S602), and the signal processing control CPU 513 sets the clock generator 117, the synchronizing signal generator 118, and a communication mode in the VIDS processing unit 110 to the same settings as those when the power switch was previously turned off (step S702). The settings when the power switch is turned off previously are read from an EEPROM (not shown, provided in the signal processing control CPU 513) holding the settings.

Next, the signal processing control CPU 513 transmits a command for requesting initialization of communication (communication initialization request command) to the camera head 501 in a vertical blanking period (step S703). This communication initialization request command is for identifying the type of a camera head transmitted before starting normal communication and reading the identification information. Then, in the next vertical blanking period, a response from the camera head 501 is read (step S704). If the response is not the identification information as the response to the request command (NO at step S705), then the signal processing control CPU 513 controls the clock generator 117 and synchronizing signal generator 118 to change the clock and synchronizing signals, as well as controls the VIDS processing unit 110 to be a communication mode corresponding to the changed clock and synchronizing signals (step S706). Then, a communication initialization request command is sent again (step S703). Steps S703 to S706 are repeated until the identification information as the response to the request command is received from the camera head 501, thereafter.

When the clock and synchronizing signals from the image processing unit 502 match the number of pixels and the video rate of the CCD of the camera head 501 and when the VIDS processing unit 110 is set correspondingly, the camera head 501 can receive the communication initialization request command. Therefore, if the signal processing control CPU 513 keeps changing communication modes at step S706 and transmitting a communication initialization request command, the camera control CPU 506 eventually receives the communication initialization request command when the matching communication mode among the communication modes is set in the VIDS processing unit 110.

After setting communication mode, the camera control CPU 506 always observes the reception of the communication initialization command (steps S603 and S604), and it receives the communication initialization command when the communication mode set in the image processing unit 502 matches the one set in the camera head 501. Then, the camera control CPU 506 transmits identification information as the response to the request command in the next vertical blanking period (step S605), and normal communication processing is performed thereafter.

Further, the signal processing control CPU 513 stops control of the clock generator 117 and the synchronizing signal generator 118 when the identification information as the response to the communication initialization request command is transmitted from the camera head 510, and fixes the clock and synchronizing signals to those generated when the identification information is received. Further, the communication mode in the VIDS processing unit 110 is also fixed to that set when the identification information is received, and the signal processing circuit 111 is controlled in accordance with the number of pixels and the video rate of the CCD in accordance with the current communication mode, clock, and synchronizing signals (step S707).

Then, information on the current communication mode, clock and synchronizing signals is stored in the EEPROM (step S708), then normal communication processing is performed thereafter (step S709). Thereby, after completing the initial communication process, communication between the camera head 501 and the image processing unit 502 and image signal processes are performed appropriately.

According to the first and second embodiments as described above, in the head detachable image sensing system, it is possible to perform image sensing operation and image processing corresponding to the image sensing device used in the camera head regardless of the number of the pixels and the video rate of the image sensing device even in a case where there is no exclusive data line for transmitting information on the image sensing device.

<Third Embodiment>

In an image sensing system whose camera head and an image processing unit can be separated in the third embodiment, a plurality of camera heads are connected to a plurality of ports of the image processing unit. The image processing unit has changeover means for switching the plurality of ports, and attributes of the camera heads connected to the plurality of ports are stored in memory means, and control means controls to perform image processes corresponding to one of the attributes of a camera head selected by switching the ports, and image signals are outputted.

Figure 7:
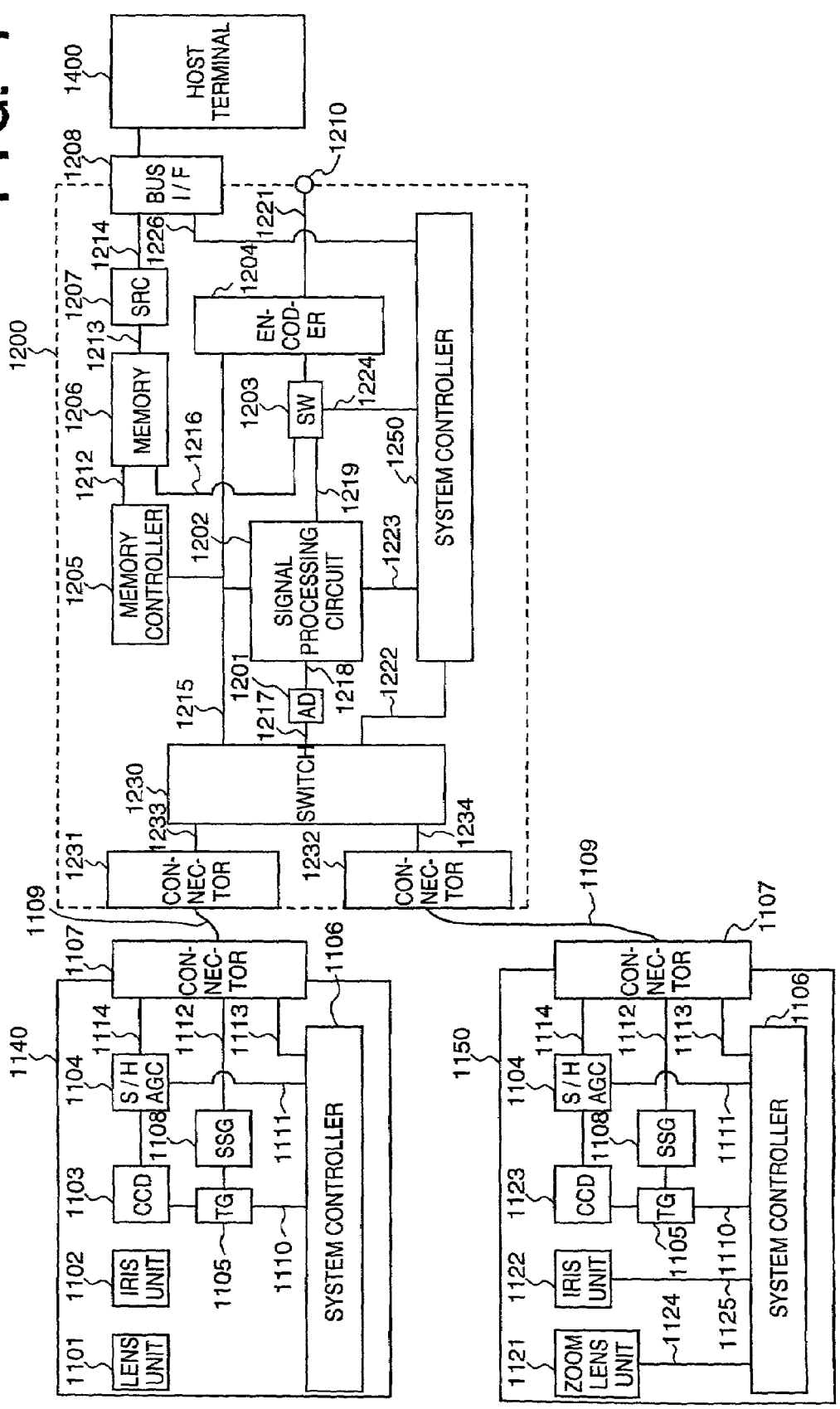
FIG. 7 is a block diagram illustrating a configuration of an image sensing system according to a third embodiment of the present invention.
Figure 17:
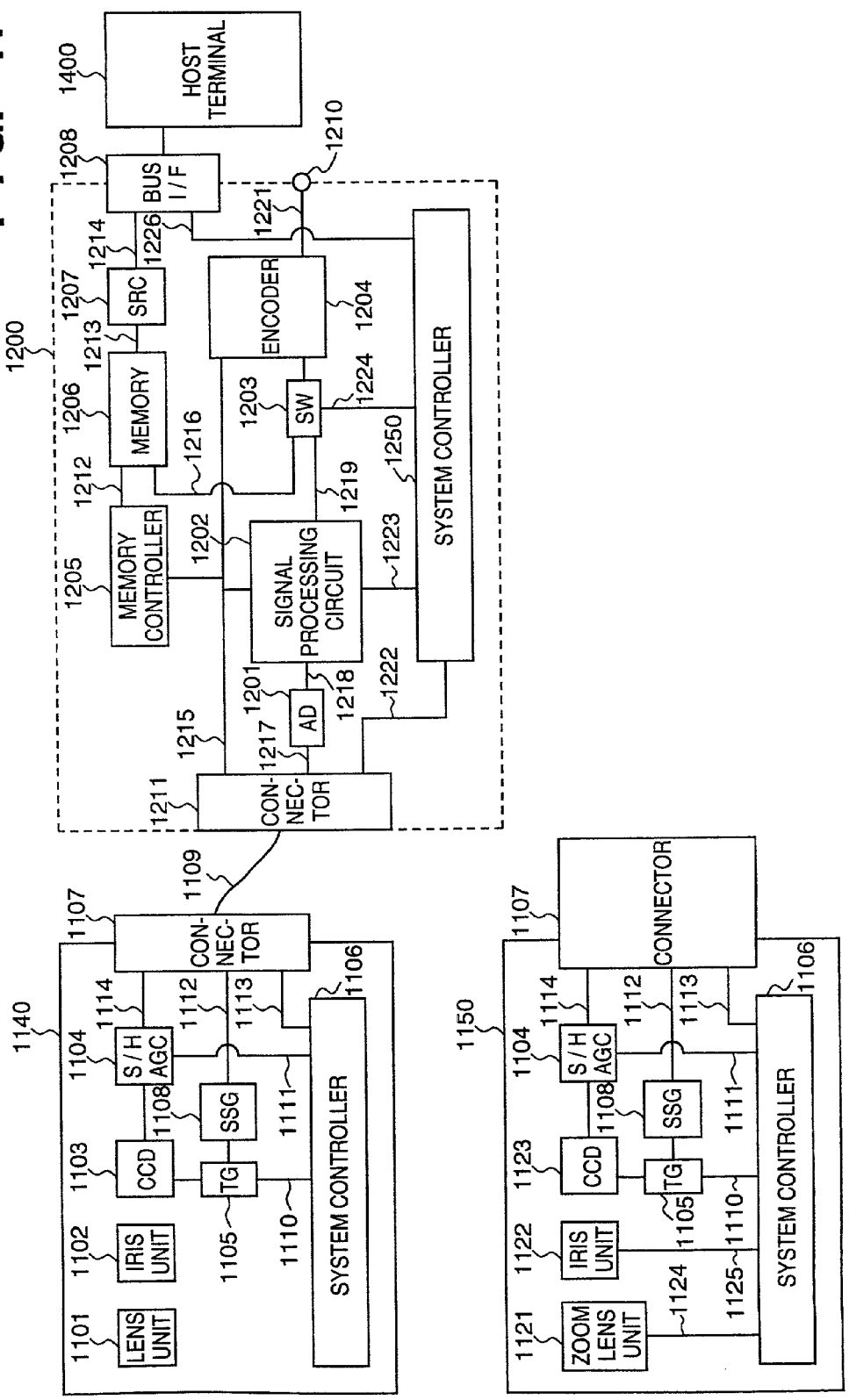
FIG. 17 is a block diagram illustrating a configuration of a conventional image sensing system.

FIG. 7 is a block diagram illustrating a configuration of an image sensing system according to the third embodiment of the present invention. In FIG. 7, the same units and elements as those in FIG. 17 of the conventional system are referred by the same reference numerals, and explanations of those are omitted. The units which are different from the conventional system are explained below.

Reference numeral 1231 denotes a connector of a port 1 (1233), and reference numeral 1232 denotes a connector of a port 2 (1234).

Further, reference numeral 1230 denotes a camera changeover switch which selects signals to be transmitted through signal lines 1215, 1217 and 1222 between the port 1 (1233) and the port 2 (1234) by controlling the switch 1230 from the system controller 1250.

Figure 8:
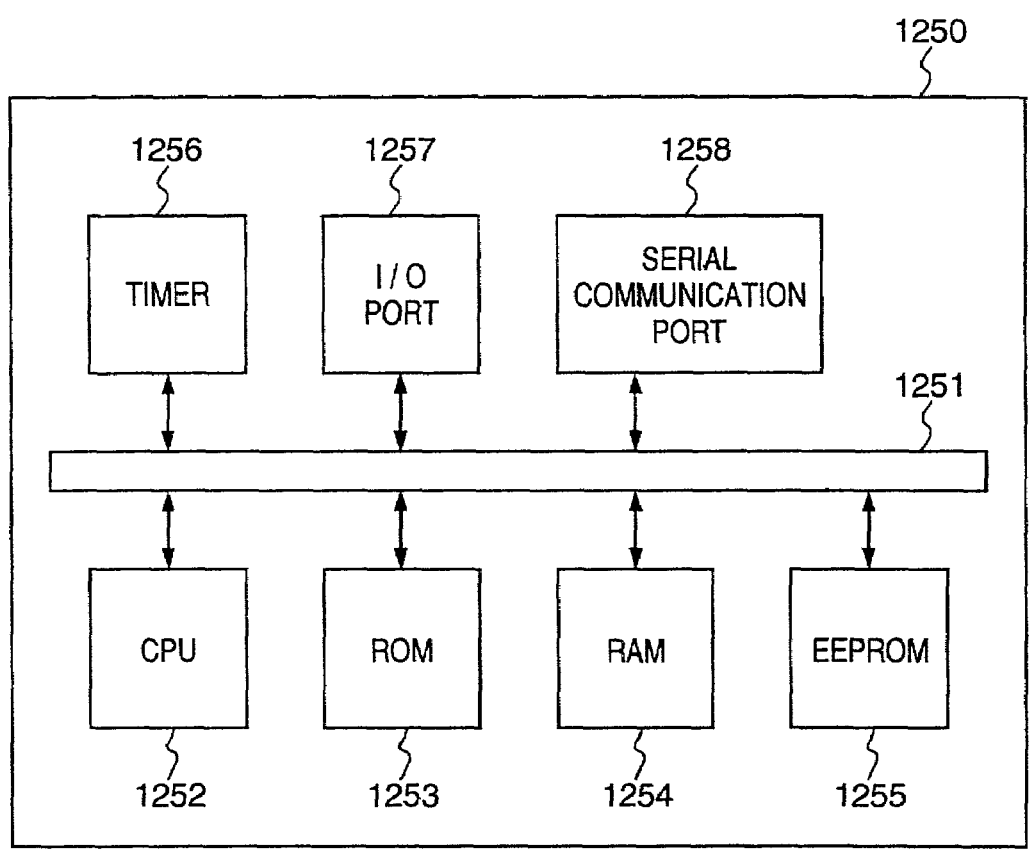
FIG. 8 is a block diagram illustrating a configuration of a system controller shown in FIG. 7.

FIG. 8 is a block diagram illustrating a configuration of the system controller 1250. The system controller 1250 comprises a one-chip microcomputer and a software for controlling it.

Reference numeral 1251 denotes an internal bus; 1252, CPU; 1253, ROM for storing software; 1254, RAM to be used as a work area for the software; 1255, an overwritable ROM (EEPROM) which stores data necessary for control; 1256, a timer; 1257, an input/output (I/O) controller for controlling each unit; and 1258, a serial communication port for communicating commands with the camera heads 1140 and 1150 and the host terminal 1400, performing serial communication with each unit of the image processing unit 1200 and controlling the unit.

Figure 9A:
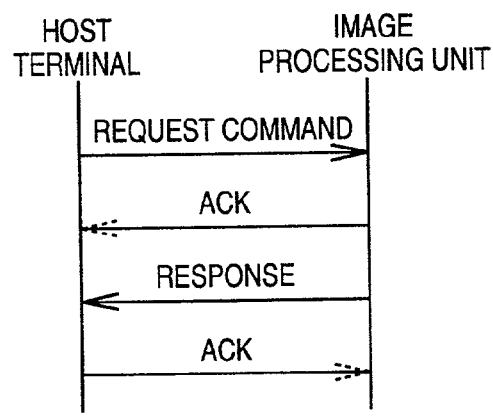
FIGS. 9A to 9C are explanatory views showing sequences of transmission and reception of control commands according to the third embodiment.
Figure 9B:
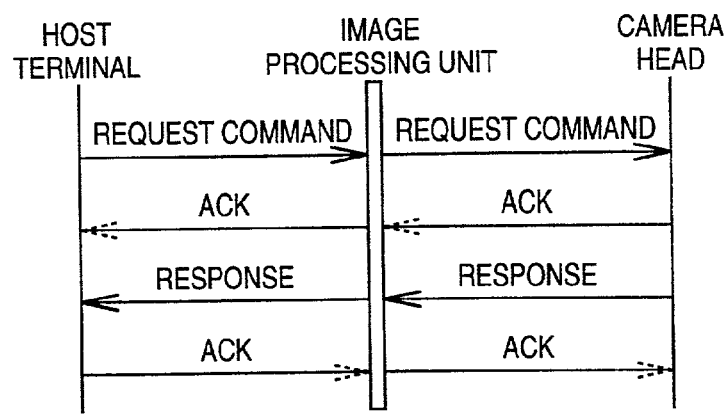
Figure 9C:
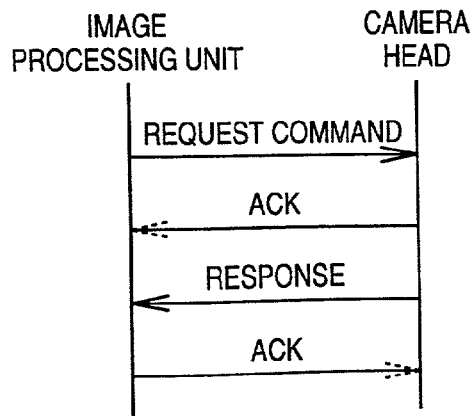

Next, sequences of transmission and reception of control commands communicated among the host terminal 1400, the image processing unit 1200, and the camera heads 1140 and 1150 are shown in FIGS. 9A to 9C.

Request commands are for requesting operations, and responses are to the request commands and transmitted when the requested operations are completed. ACK shows a frame for notifying the originating side of a command that the command is normally received.

FIG. 9A shows a sequence in which the host terminal 1400 requests an operation to the image processing unit 1200. When the image processing unit 1200 receives a request command from the host terminal 1400, it executes the request command and transmits a response when the execution is completed.

FIG. 9B shows a sequence in which the host terminal 1400 requests an operation to the camera head 1140 or 1150. The image processing unit 1200 passes a request command from the host terminal 1400 to the camera head 1140 or 1150 if the request command is addressed to the camera head 1140 or 1150. Further, the image processing unit 120 passes the response from the camera head 1140 or 1150 to the host terminal 1400 if the response is addressed to the host terminal 1400.

FIG. 9C shows a sequence in which the image processing unit 1200 requests an operation to the camera head 1140 or 1150.

FIGS. 10A to 10D show formats of the commands.

FIG. 10A shows a command frame format. L indicates the frame length and shows with how many bytes of data the frame is configured. FID indicates a frame identifier used for identifying the attribute of the frame. CID is identifies a command.

FIG. 10B shows an ACK frame format. A length (L) is fixed to two bytes. A frame identifier (FID) is fixed to '80h'. When a parameter field is '00h', it shows that the command frame is received without an error, whereas if the parameter field is a value other then '00h', it indicates that an error occurred. A cause of the error is identified by the value of the parameter.

FIG. 10C shows a configuration of the frame identifier (FID) by bit. Bit7 is a bit for identifying whether the frame is the command frame or the ACK frame. Bit2 and bit3 are destination device designation bits for designating the destination of the command. Bit0 and bit1 are originator designation bits for designating an originator of the command.

FIG. 10D shows a configuration of the command identifier (CID) by bit. Bit7 is effective in the response, and it is set to 0 when the function designated by the request command is normally completed, and set to 1 when the function is not normally completed. Whether the response indicates successful or unsuccessful is judged by this bit. Bit6 to bit0 are command bits for specifying the type of the command.

FIGS. 11A to 11C are explanatory views showing formats of commands used for initialization which are communicated between the host terminal 1400 and the image processing unit 1200.

FIG. 11A is a command for requesting initialization (initialization request command) transmitted from the host terminal 1400 to the image processing unit 1200.

FIG. 11B is a command for responding to an initialization request command (initialization response) transmitted from the image processing unit 1200 to the host terminal 1400.

FIG. 11C shows the contents of camera attribute parameters of parameters 1 and 2 in the initialization response. The attributes of camera heads correspond to parameter values as shown in the table. In the third embodiment, four types of cameras can be connected.

FIGS. 12A and 12B are explanatory views showing formats of commands for obtaining attribute of camera head communicated between the image processing unit 1200 and the camera head 1140 or 1150.

FIG. 12A is a format of the command for requesting a camera attribute (camera attribute request command) to be transmitted from the image processing unit 1200 to the camera head 1140 or 1150.

FIG. 12B is a format of the command for responding to the camera attribute request command (camera attribute response) to be transmitted from the camera head 1140 or 1150 to the image processing unit 1200. The value in the parameter 1 is the camera attribute parameter shown in FIG. 11C.

FIGS. 13A to 13C are explanatory views showing formats of commands used for switching ports which are communicated between the host terminal 1400 and the image processing unit 1200.

FIG. 13A is a command for requesting to change ports (port changeover request command) transmitted from the host terminal 1400 to the image processing unit 1200.

FIG. 13B is a command for responding to the port changeover request command (port changeover response (successful)) transmitted from the image processing unit 1200 to the host terminal 1400.

FIG. 13C is another command for responding to the port changeover request command (port changeover response (unsuccessful)) transmitted from the image processing unit 1200 to the host terminal 1400.

Figure 14:
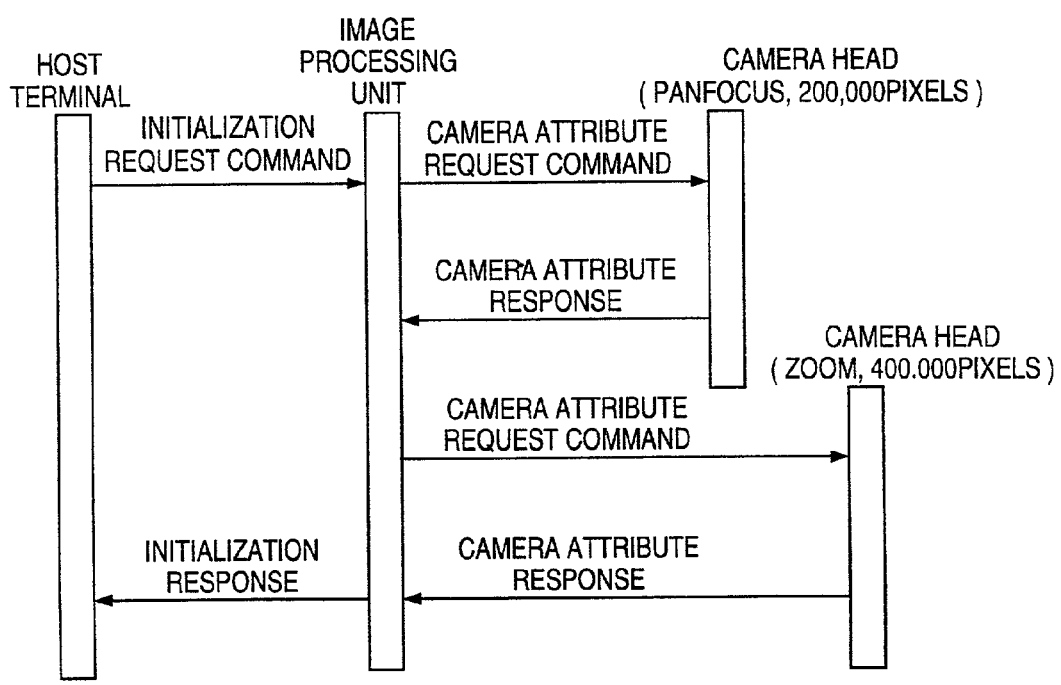
FIG. 14 is an explanatory view showing a sequence of transmission and reception of commands for initialization according to the third embodiment.

FIG. 14 is an explanatory view showing a sequence of transmission and reception of commands for initialization.

In this example, a case where the panfocus camera head 1140 having 200,000 pixels is connected to the port 1 (1233) and the zoom camera head 1150 having 400,000 pixels is connected to the port 2 (1234) is explained.

First, an initialization request command is transmitted from the host terminal 1400 to the image processing unit 1200. The image processing unit 1200 switches the camera changeover switch 1230 to the port 1 (1233), and transmits a camera attribute request command. The panfocus camera head 1140 of 200,000 pixels which received the camera attribute request command transmits a camera attribute response to the image processing unit 1200. The image processing unit 1200 then switches the camera changeover switch 1230 to the port 2 (1234), and transmits a camera attribute request command. The zoom camera head 1150 of 400,000 pixels which received the camera attribute request command transmits a camera attribute response to the image processing unit 1200. Thereafter, the image processing unit 1200 transmits the camera attribute responses from the two camera heads to the host terminal 1400.

Figure 15:
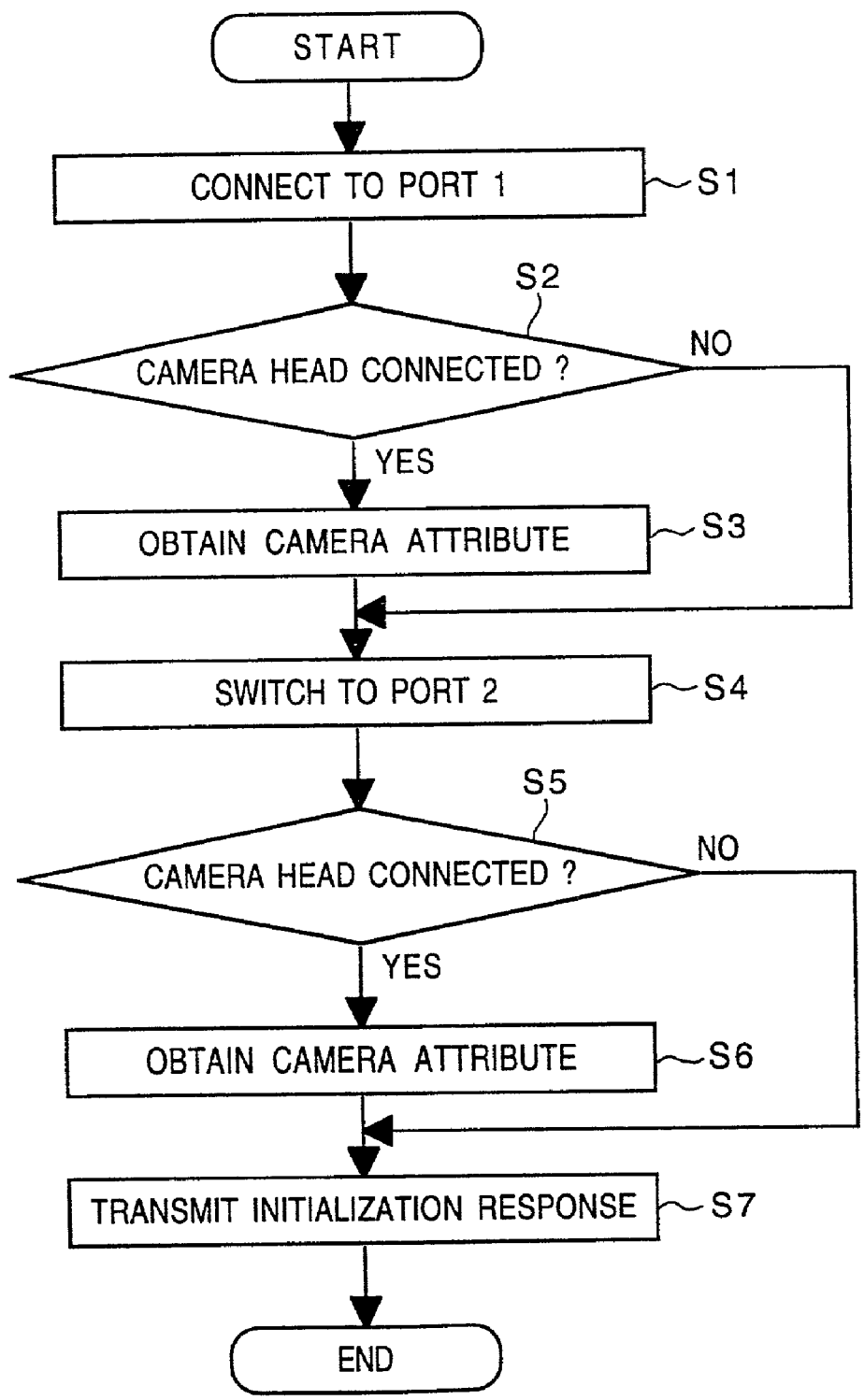
FIG. 15 is a flowchart showing an operation of a system controller of the image processing unit which received an initialization request command according to the third embodiment.

FIG. 15 is a flowchart showing an operation of a system controller 1250 when the image processing unit 1200 receives an initialization request command from the host terminal 1400.

At step S1, the camera changeover switch 1230 connects to the port 1 (1233). At step S2, whether an image synchronizing signal is on the signal line 1215 or not is checked. If there is no image synchronizing signal, it means that no camera head is connected to the port 1 (1233). In such case, information indicating that no camera is connected to the port 1 (1233) is stored, then the process moves to step S4.

If there is an image synchronizing signal at step S2, then it is confirmed that a camera head is connected, therefore, the process proceeds to step S3.

At step S3, the image processing unit 1200 transmits a camera attribute request command to the camera head 1140, and reads the camera attribute parameter in the camera attribute response from the camera head 1140, and stores it as a camera head connected to the port 1 (1233).

At step S4, the camera changeover switch 1230 is switched to the port 2 (1234). At step S5, whether there is an image synchronizing signal on the signal line 1215 or not is checked. If there is no image synchronizing signal, then it means no camera is connected to the port 2 (1234). Therefore, information indicating that no camera is connected to the port 2 (1234) is stored, then the process moves to step S7.

If an image synchronizing signal is detected at step S5, since a camera head is connected, thus the process proceeds to step S6.

At step S6, the image processing unit 1200 transmits a camera attribute request command to the camera head 1150, then reads the camera attribute parameter in the camera attribute response from the camera head 1150, then stores it as a camera connected to the port 2 (1234). At step S7, an initialization response to which camera attribute parameters of the ports 1 and 2 (1233 and 1234) are added is transmitted to the host terminal 1400.

Figure 16:
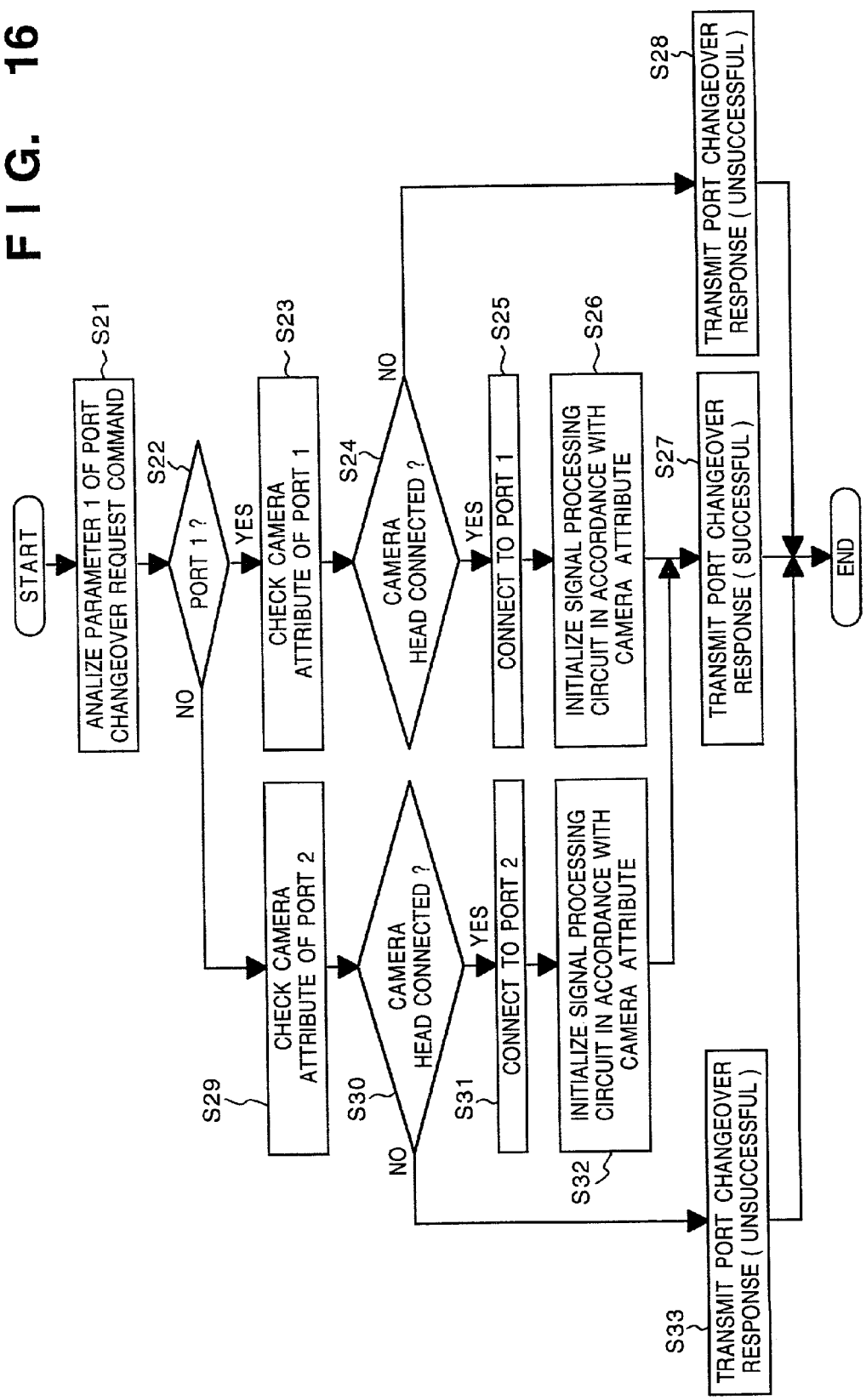
FIG. 16 is a flowchart showing an operation of the system controller of the image processing unit which received a port changeover request command according to the third embodiment.

FIG. 16 is a flowchart showing an operation of the system controller 1250 when the image processing unit 1200 receives a port changeover request command from the host terminal 1400.

At step S21, the port number of the parameter 1 of the port changeover request command is analyzed. If the port number of the parameter 1 is "1" at step S22, then the process proceeds to step S23, whereas, if it is "2", then the process moves to step S29. Then, the attribute of the camera head connected to the port 1 (1233) or the port 2 (1234) are checked, then the process proceeds to step S24 or S30.

At step S24, the attribute of the camera head connected to the port 1 which is stored during initialization is checked. If it is determined that no camera is connected to the port 1 at step S24, the process moves to step S28 where a port changeover response (unsuccessful) is transmitted to the host terminal 1400.

If it is determined that a camera head is connected to the port 1 at step S24, then the process proceeds to step S25 where the camera changeover switch 1230 connects to the port 1. Thereafter, the signal processing circuit 1202 is initialized in accordance with the attribute of the camera head (200,000 pixel mode, in this case) at step S26. Then at step S27, a port changeover response (successful) is transmitted to the host terminal 1400.

At step S29, the attribute of the camera head connected to the port 2 (1234) stored during the initialization is checked. If it is determined that a camera head is connected to the port 2 at step S30, then process proceeds to step S31, whereas, if it is determined that no camera head is connected to the port 2, then the process moves to step S33 where a port changeover response (unsuccessful) is transmitted to the host terminal 1400. At step S31, the camera changeover switch 1230 connects to the port 2 (1234). Thereafter, at step S32, the signal processing circuit 1202 is initialized in accordance with the attribute of the camera head (400,000 pixel mode, in this case). Then, a port changeover response (success) is transmitted to the host terminal 1400.

It should be noted that the system controller 1250 of the image processing unit 1200 shown in FIG. 7 may store the attributes of the camera heads connected to the port 1 (1233) and the port 2 (1234), and the image processing unit 1200 performs settings of the signal processing circuit 1202 in accordance with the attribute of the camera head when the port is switched.

Further, it is possible for the host terminal 1400 to have the aforesaid functions. More specifically, the host terminal 1400 stores attribute of the camera head connected to each port during initialization, and may designate a port to be switched to and the settings of the image processing unit 1200 (200,000 or 400,000 pixel mode) in accordance with the attribute of the camera head when issuing the port changeover request command.

In the third embodiment as described above, the image processing unit 1200 has two connectors, however, it can have more than two connectors.

Furthermore, the camera heads connected to the image processing unit 1200 are not limited to the ones having 200,00 and 400,000 pixels.

According to the present invention as described above, it is possible to sense images by using a plurality of camera heads without detaching and attaching camera heads from/to the image processing unit, thereby operability of image sensing operation performed by using a plurality of camera heads improves.

The present invention is not limited to the above embodiments and various changes and modifications can be made within the spirit and scope of the present invention. Therefore to appraise the public of the scope of the present invention, the following claims are made.

What is claimed is:

1. An image sensing apparatus connected to an external image processing apparatus comprising:

image sensing circuit for sensing an object and outputting an image signal;

communication circuit for transmitting the image signal and identification information on said image sensing circuit; and control circuit for controlling said image sensing circuit and a communication mode of said communication circuit in accordance with driving signals, transmitted from the image processing apparatus, wherein said communication circuit mutes the image signal while predetermined communication between said image sensing apparatus and said external image processing apparatus is carried out in synchronism with a predetermined synchronous camera control signal, and wherein said control circuit controls said communication circuit set to a predetermined communication mode in an initial state, and said communication circuit transmits the identification information under the initial state, then said control circuit changes the predetermined communication mode set in said communication circuit if the predetermined mode does not conform to said image sensing circuit.

2. The image sensing apparatus according to claim 1, wherein the identification information at least includes a number of pixels or a video rate of said image sensing means.

3. An image sensing apparatus connected to an external image processing apparatus comprising:

image sensing circuit for sensing an object and outputting an image signal;

communication circuit for transmitting the image signal and identification information on said image sensing circuit; and control circuit for controlling said image sensing circuit and a communication mode of said communication circuit in accordance with driving signals, transmitted from the image processing apparatus, wherein said communication circuit mutes the image signal while predetermined communication between said image sensing apparatus and said external image processing apparatus is carried out in synchronism with a predetermined synchronous camera control signal, said communication circuit comprises muting circuit for muting a signal level of the image signal obtained by said image sensing circuit and outputting the muted signals to said communication circuit.

4. An image sensing apparatus connected to an external image processing apparatus comprising:

image sensing circuit for sensing an object and outputting an image signal;

communication circuit for transmitting the image signal and identification information on said image sensing circuit; and control circuit for controlling said image sensing circuit and a communication mode of said communication circuit in accordance with driving signals, transmitted from the image processing apparatus, wherein said communication circuit mutes the image signal while predetermined communication between said image sensing apparatus and said external image processing apparatus is carried out in synchronism with a predetermined synchronous camera control signal, wherein said control circuit controls said communication circuit set to a communication mode corresponding to a type of said image sensing circuit in an initial state, and said communication circuit transmits a signal responding to a request signal transmitted from the image processing apparatus as the identification information.

5. The image sensing apparatus according to claim 1 wherein said communication circuit communicates in a vertical interval data signal method.

6. The image sensing apparatus according to claim 1, further comprising driving signals that include a synchronizing signal and a clock signal.

7. The image sensing apparatus according to claim 1, wherein at least an amount of information is changed in accordance with the communication mode.

8. The image sensing apparatus according to claim 3, wherein the identification information at least includes a number of pixels or a video rate of said image sensing means.

9. The image sensing apparatus according to claim 3, wherein said communication circuit communicates in a vertical interval data signal method.

10. The image sensing apparatus according to claim 3, further comprising driving signals that include a synchronizing signal and a clock signal.

11. The image sensing apparatus according to claim 3, wherein at least an amount of information is changed in accordance with the communication mode.

12. The image sensing apparatus according to claim 4, wherein the identification information at least includes a number of pixels or a video rate of said image sensing means.

13. The image sensing apparatus according to claim 4, wherein said communication circuit communicates in a vertical interval data signal method.

14. The image sensing apparatus according to claim 4, further comprising driving signals that include a synchronizing signal and a clock signal.

15. The image sensing apparatus according to claim 4, wherein at least an amount of information is changed in accordance with the communication mode.

* * * * *